United States Patent
Leshem (10) Patent No.: US 10,902,575 B2
(45) Date of Patent: Jan. 26, 2021

(54) AUTOMATED GRAINS INSPECTION

(71) Applicant: INSPECT TECHNOLOGIES LTD, Karmiel (IL)

(72) Inventor: Nadav Leshem, Lavon (IL)

(73) Assignee: Inspect Technologies LTD, Karmiel (IL)

( * ) Notice: Subject to any disclaimer, the term of this patent is extended or adjusted under 35 U.S.C. 154(b) by 82 days.

(21) Appl. No.: 16/400,614

(22) Filed: May 1, 2019

(65) Prior Publication Data
US 2020/0349692 A1   Nov. 5, 2020

(51) Int. Cl.
| | |
|---|---|
| *G06K 9/00* | (2006.01) |
| *G06T 7/00* | (2017.01) |
| *H04N 5/225* | (2006.01) |
| *A01D 41/12* | (2006.01) |
| *A01D 41/127* | (2006.01) |

(52) U.S. Cl.
CPC .......... *G06T 7/0002* (2013.01); *A01D 41/127* (2013.01); *A01D 41/1208* (2013.01); *H04N 5/2256* (2013.01)

(58) Field of Classification Search
CPC ....... G06T 7/0004; G06T 7/408; G06T 7/001; G06T 7/0002; G06T 2207/30128; G06T 2207/30148; G06T 2207/30164; H04N 5/2256; B07C 5/3422; A01D 41/1208; A01D 41/127; A22B 5/0064; G01N 21/88
See application file for complete search history.

(56) References Cited

U.S. PATENT DOCUMENTS

| | | | | |
|---|---|---|---|---|
| 3,738,484 A | * | 6/1973 | Hoover | B07C 5/366 209/581 |
| 4,357,864 A | * | 11/1982 | Salete-Garces | B02B 7/02 451/312 |
| 4,703,647 A | * | 11/1987 | Eckhoff | G01N 3/40 241/6 |
| 5,005,774 A | * | 4/1991 | Martin | G01N 3/40 221/211 |
| 5,865,990 A | * | 2/1999 | Novak | B07C 5/3425 209/579 |
| 5,917,927 A | * | 6/1999 | Satake | G06T 7/0004 356/237.1 |
| 5,986,230 A | * | 11/1999 | Novak | B07C 5/3416 209/579 |
| 7,340,084 B2 | | 3/2008 | Hamid | |

(Continued)

FOREIGN PATENT DOCUMENTS

| | | |
|---|---|---|
| CN | 2740303 Y | 11/2005 |
| JP | 2010197239 A | 9/2010 |

*Primary Examiner* — Amir Alavi
(74) *Attorney, Agent, or Firm* — William Dippert; Laurence Greenberg; Werner Stemer (57) ABSTRACT

An automated grains inspection apparatus for a production line comprises an inlet to receive the grains and an outlet from which the grains are discharged. A feeder configured to receive the grains from the inlet and release the grains aligned in a line formation is provided while at least one camera is positioned sideway beneath the feeder to capture images of the grains while they fall. At least one background surface positioned sideway beneath the feeder and opposite the camera is also provided in an inspection zone so that the grains are configured to be aligned between the camera and the background surface.

22 Claims, 10 Drawing Sheets

(56) References Cited

U.S. PATENT DOCUMENTS 7,830,530 B2 * 11/2010 Jonasson Bjarang ........................ B07C 5/3425
356/601
10,740,893 B2 * 8/2020 Hadar .................. H04N 5/2258

* cited by examiner

AUTOMATED GRAINS INSPECTION

TECHNICAL FIELD

The present disclosed subject matter relates to automated inspection. More particularly, the present disclosed subject matter relates to quality control of grains in a production line.

BACKGROUND

Automated inspection is a process of inspecting or sometime also sorting small solid materials, typically hard, as a part of controlling the quality of the particles in a production line. Commercially available inspecting and sorting machines use optical sensors and image processing for determining the material color, size, shape, and structural properties. Typically, the inspecting and sorting machines compare the solid particles objects to user-defined baseline thresholds for qualifying the material into production/shipment or failing it.

Old fashion manual inspecting and/or sorting is subjective, unreliable and inconsistent, whereas optical sorting improves the overall product quality, maximize throughput, increase yields and reduces manual labor costs.

Inspecting and sorting machines can be used for products such as plastic grains, metal, or glass grains, or the like as well as food material such as beans, spices, nuts, grains, rice, vegetables and fruits.

BRIEF SUMMARY

Unless otherwise defined, all technical and scientific terms used herein have the same meaning as commonly understood by one of ordinary skill in the art to which this disclosed subject matter belongs. Although methods and materials similar or equivalent to those described herein can be used in the practice or testing of the present disclosed subject matter, suitable methods and materials are described below. In case of conflict, the specification, including definitions, will control. In addition, the materials, methods, and examples are illustrative only and not intended to be limiting.

It is provided in accordance with an exemplary embodiment, an automated grains inspection apparatus, the automated apparatus comprising:
  an inlet to receive the grains;
  an outlet from which the grains are discharged;
  a feeder configured to receive the grains from the inlet and release the grains aligned in a line formation;
  at least one camera positioned sideway beneath the feeder to capture images of the grains while they fall; and
  at least one background surface positioned sideway beneath the feeder and opposite the camera so that the grains are configured to be aligned between the camera and the background surface.

It is further provided in accordance with another exemplary embodiment, the apparatus further provided with at least one illumination directed towards the background surface and configured to pass through the grains when falling.

It is further provided in accordance with another exemplary embodiment, at least one of the cameras is an area camera.

It is further provided in accordance with another exemplary embodiment, the at least one background surface is two background surfaces and said two background surfaces comprises a white background and a black background.

It is further provided in accordance with another exemplary embodiment, the black background is recessed with respect to the white background.

It is further provided in accordance with another exemplary embodiment, the feeder is a slot feeder.

It is further provided in accordance with another exemplary embodiment, the slot is an adjustable slot having a span configured to correspond to the grains under inspection.

It is further provided in accordance with another exemplary embodiment, the apparatus further comprising a sorting mechanism.

It is further provided in accordance with another exemplary embodiment, the sorting mechanism is selected from a group of sorting mechanisms consisting of deflection; diverter valve, flap removal; pressurized-air removal, a combination thereof, or the like.

It is further provided in accordance with another exemplary embodiment, the apparatus further comprising a plurality of blades organized perpendicularly along the feeder.

It is further provided in accordance with another exemplary embodiment, the apparatus is positioned within a grain production line.

It is further provided in accordance with another exemplary embodiment, a grain inspection system to be operated by a user comprising:
  an automated grains inspection apparatus;
  a controller configured to control at least the at least one camera and the feeder within the inspection apparatus; and
  a processor configured to receive captured images from the at least one camera and analyze the captured images as well as transmit or receive information and instructions based on an analysis of the captured images.

It is further provided in accordance with another exemplary embodiment, the system further comprises
  a memory unit communicating with said processor wherein the memory unit is configured to retain information selected from a group of information consisting of the captured images, a plurality of grain profiles, system settings, system reports, image analysis, reference profiles comprising thresholds for different types of grains, statistical analysis associated with reference profiles; any combination thereof, or the like; and
  a display configured to display histograms and thumbnail-image generated in the processor based on the captured images.

It is further provided in accordance with another exemplary embodiment, a method of automatically inspecting grains comprising:
  providing an inspection apparatus in accordance with an exemplary embodiment;
  obtaining grain profile of the grains;
  setting a slot in the feeder according to the grain profile;
  pouring the grains into the inlet and through the feeder so as to allow the grains to fall through the slot in a line arrangement and into the outlet;
  operating the camera so as to capture images of grains falling beneath the slot; and
  inspecting the grains in the images.

It is further provided in accordance with another exemplary embodiment, the method further comprising setting background lighting directed onto the at least two background surfaces and through the grains while falling.

It is further provided in accordance with another exemplary embodiment, the at least one camera is an area camera.

It is further provided in accordance with another exemplary embodiment, the at least one background surface is two background surfaces and said two background surfaces comprise a white background and a black background.

It is further provided in accordance with another exemplary embodiment, the method further comprising analyzing the grains and determining criteria of each grain in the image, wherein the criteria are selected from a group consisting of size, pigmentation, shape, color, hue and morphology of the grains.

It is further provided in accordance with another exemplary embodiment, the method further comprising generating histogram representations of dimensions and criteria of the grains.

It is further provided in accordance with another exemplary embodiment, the method further comprising setting thresholds based on the histogram representations and thumbnail images.

It is further provided in accordance with another exemplary embodiment, the method further comprising sorting the grains based on predetermined parameters of the grain profile.

It is further provided in accordance with another exemplary embodiment, the predetermined parameters comprise thresholds.

BRIEF DESCRIPTION OF THE DRAWINGS

Some embodiments of the disclosed subject matter described, by way of example only, with reference to the accompanying drawings. With specific reference now to the drawings in detail, it is stressed that the particulars shown are by way of example and for purposes of illustrative discussion of the preferred embodiments of the present disclosed subject matter only, and are presented in the cause of providing what is believed to be the most useful and readily understood description of the principles and conceptual aspects of the disclosed subject matter. In this regard, no attempt is made to show structural details of the disclosed subject matter in more detail than is necessary for a fundamental understanding of the disclosed subject matter, the description taken with the drawings making apparent to those skilled in the art how the several forms of the disclosed subject matter may be embodied in practice.

In the drawings.

DETAILED DESCRIPTION OF THE INVENTION

Before explaining at least one embodiment of the disclosed subject matter in detail, it is to be understood that the disclosed subject matter is not limited in its application to the details of construction and the arrangement of the components set forth in the following description or illustrated in the drawings. The disclosed subject matter is capable of other embodiments or of being practiced or carried out in various ways. Also, it is to be understood that the phraseology and terminology employed herein is for the purpose of description and should not be regarded as limiting. The drawings are generally not to scale. For clarity, non-essential elements were omitted from some of the drawings.

The terms "comprises", "comprising", "includes", "including", and "having" together with their conjugates mean "including but not limited to". The term "consisting of" has the same meaning as "including and limited to".

The term "consisting essentially of" means that the composition, method or structure may include additional ingredients, steps, and/or parts, but only if the additional ingredients, steps and/or parts do not materially alter the basic and novel characteristics of the claimed composition, method or structure.

As used herein, the singular form "a", "an", and "the" include plural references unless the context clearly dictates otherwise. For example, the term "a compound" or "at least one compound" may include a plurality of compounds, including mixtures thereof.

Throughout this application, various embodiments of this disclosed subject matter may be presented in a range format. It should be understood that the description in range format is merely for convenience and brevity and should not be construed as an inflexible limitation on the scope of the disclosed subject matter. Accordingly, the description of a range should be considered to have specifically disclosed all the possible sub-ranges as well as individual numerical values within that range.

It is appreciated that certain features of the disclosed subject matter, which are, for clarity, described in the context of separate embodiments, may also be provided in combination in a single embodiment. Conversely, various features of the disclosed subject matter, which are, for brevity, described in the context of a single embodiment, may also be provided separately or in any suitable sub-combination or as suitable in any other described embodiment of the disclosed subject matter. Certain features described in the context of various embodiments are not to be considered essential features of those embodiments, unless the embodiment is inoperative without those elements.

Figure 1:
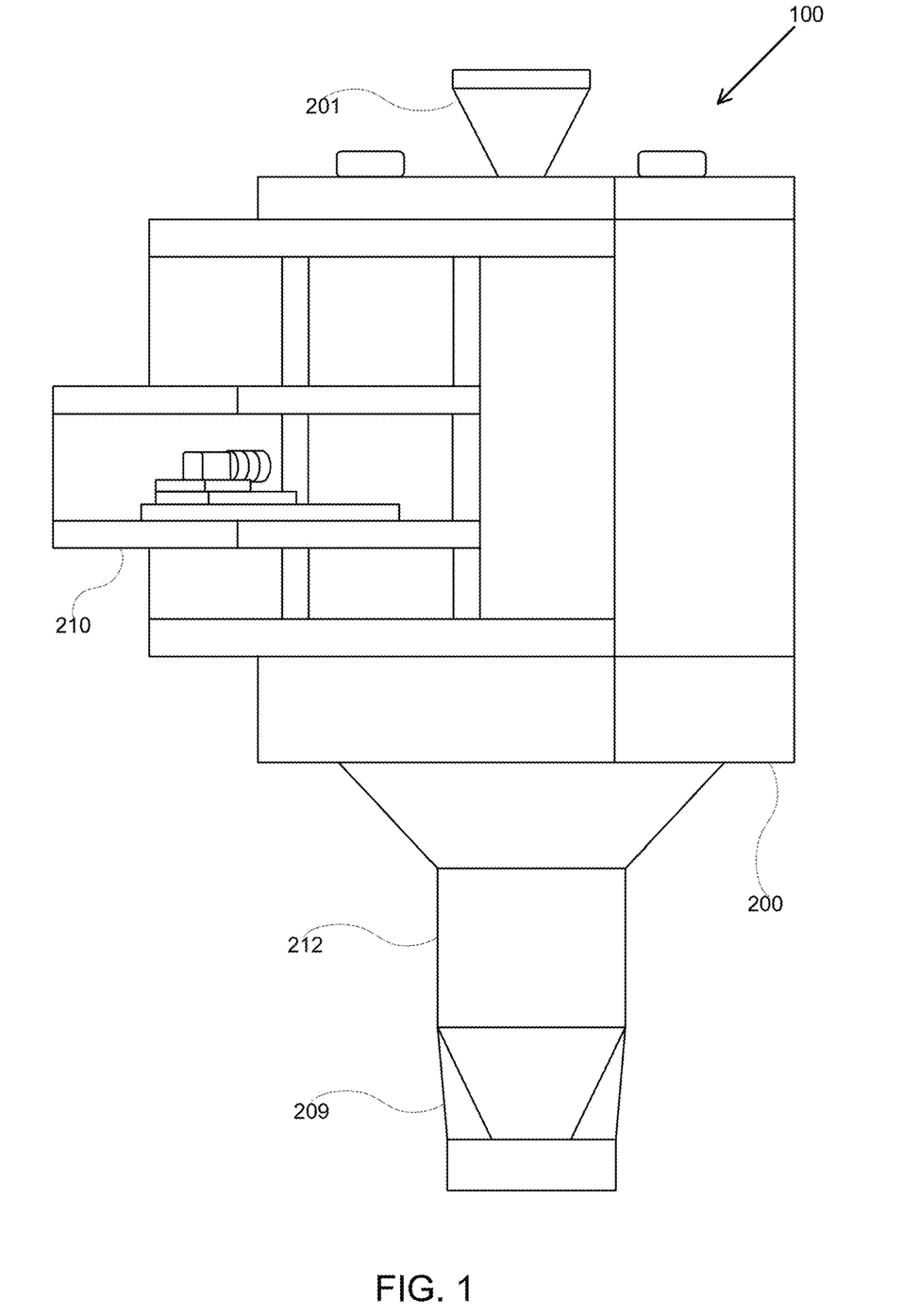
FIG. 1 shows an automated grains inspection apparatus (AIA), in accordance with some exemplary embodiments of the disclosed subject matter.

Referring now to FIG. 1 showing an automated grains inspection apparatus (AIA) 100, in accordance with some exemplary embodiments of the disclosed subject matter. The AIA 100 is an apparatus configure to run a quality control process of inspecting and sorting solid material in a production line. In some exemplary embodiments, AIA 100 can be adapted to inspect and sort the material according to criteria, such as color, size, shape, structural properties and any combination thereof, or the like. The material sorted by AIA 100 is a plurality of discrete elements, such as for example beans, spices, nuts, grains, rice, vegetables, fruits, plastic grains, metal grains, glass grains, pharmaceutical pills, and any combination thereof, or the like.

For the sake of simplicity, the present disclosure shall refer hereinafter to the material that is sorted by the AIA 100 as the "grains".

In some exemplary embodiments, the AIA 100 can be used in-line a production-line; off-line the production-line; in-parallel to the production-line; and any combination thereof. In the in-line exemplary embodiment, all the grains to be consumed in production first enters the AIA 100, for inspecting, through an inlet, and preferably an inlet funnel 201 and proceed to the production-line from outlet 209, where the grains are discharged. In the off-line exemplary embodiment, all or portion of the grains may be tested/sorted prior of being introduced to the production line. In the in-parallel exemplary embodiment, a portion of the material to be consumed in production enters the AIA 100, for inspecting or sorting, through inlet funnel 201 and proceed to the production-line from outlet 209.

Figure 2:
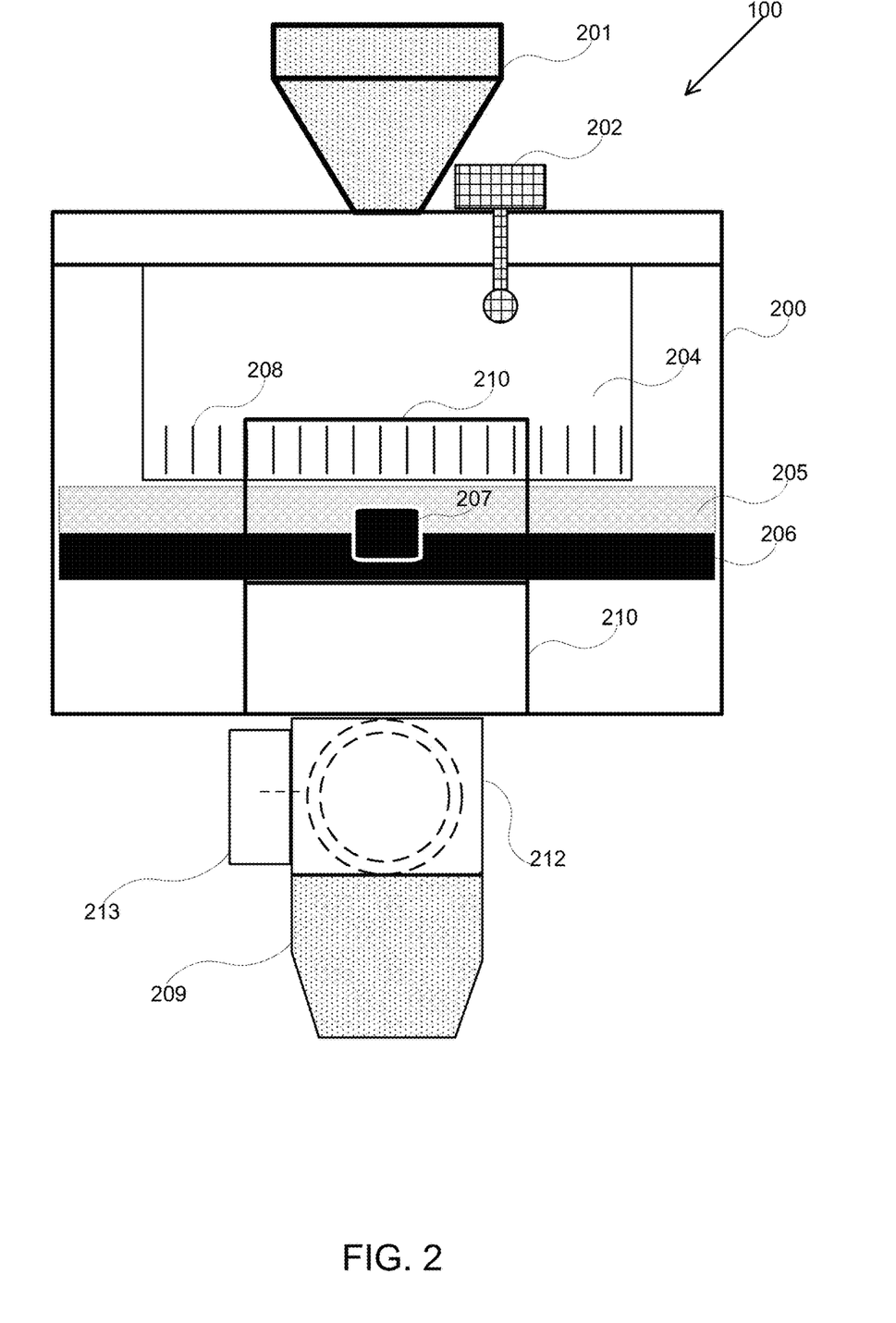
FIG. 2 shows a front view of the automated grains inspection apparatus, in accordance with some exemplary embodiments of the disclosed subject matter.

Referring now to FIG. 2 showing a front view of the automated grains inspection apparatus, in accordance with some exemplary embodiments of the disclosed subject matter. AIA 100 comprises a housing 200 having an inspection zone, inlet funnel 201, outlet 209, second outlet 212 and sorting mechanism 213. In some exemplary embodiments, inlet funnel 201 is interfacing between housing 200 and feeding tube or a hopper (not shown), which enables pouring grains into the AIA 100. Housing 200 also incorporates feeder mechanism 202, slot feeder 204, background surface and preferably a first background surface 205, a second background surface 206, and a camera 207.

In some exemplary embodiments, slot feeder 204 is adapted to receive grains from inlet funnel 201 and release them in line formation into the inspection zone of the housing, where the line thickness is substantially and preferably, but not necessarily equivalent to a thickness of a single grain. In that way, the slot feeder 204 acts as a buffer that collects grains and align them in a single line formation, across the housing 200, so that they fall as curtainlike through the housing and through an inspection zone in which the grains are being imaged. In some exemplary embodiments, the feeder mechanism 202 can be used for adjusting the line thickness of an outlet (not shown) of the slot feeder 204 to a thickness of a single grain, or any other suitable thickness. In some exemplary embodiments, the first background surface 205 and the second background surface 206 may each constitutes a different background for images taken by camera 207. It should be noted that camera 207, situated on camera compartment 210, faces (looking at) the curtainlike released grains and backgrounds 205 and 206 that are situated behind the curtainlike falling grains.

It should be also noted that a plurality of cameras can be used. One or more of the plurality of cameras can be positioned opposite the camera depicted in FIG. 2. In this way, the oppositely positioned camera captures images from the other side of the grains. The oppositely positioned camera can be provided with an independent illumination system and set of backgrounds. This double functioning apparatus enables capturing images for full inspection of the grains.

In some other exemplary embodiments, the grains can slide in a curtainlike structure on a surface that is inclined beneath the slot feeder, wherein the surface can be the background surface as an example. This optional structure can decrease the velocity of the grains when they pass through the inspection zone so as to enhance the quality of the image that will be captured by the camera. Generally, and in this case particularly, the slot in the slot feeder can be wider or a feeder can be used that has no slot and the grains pass through a feeder having another opening profile.

In some exemplary embodiments, upon detecting grains that fails (unqualified) quality control inspection, the sorting mechanism 213 can be configured to deflect unqualified grains from outlet 209 to second outlet 212.

Figure 3:
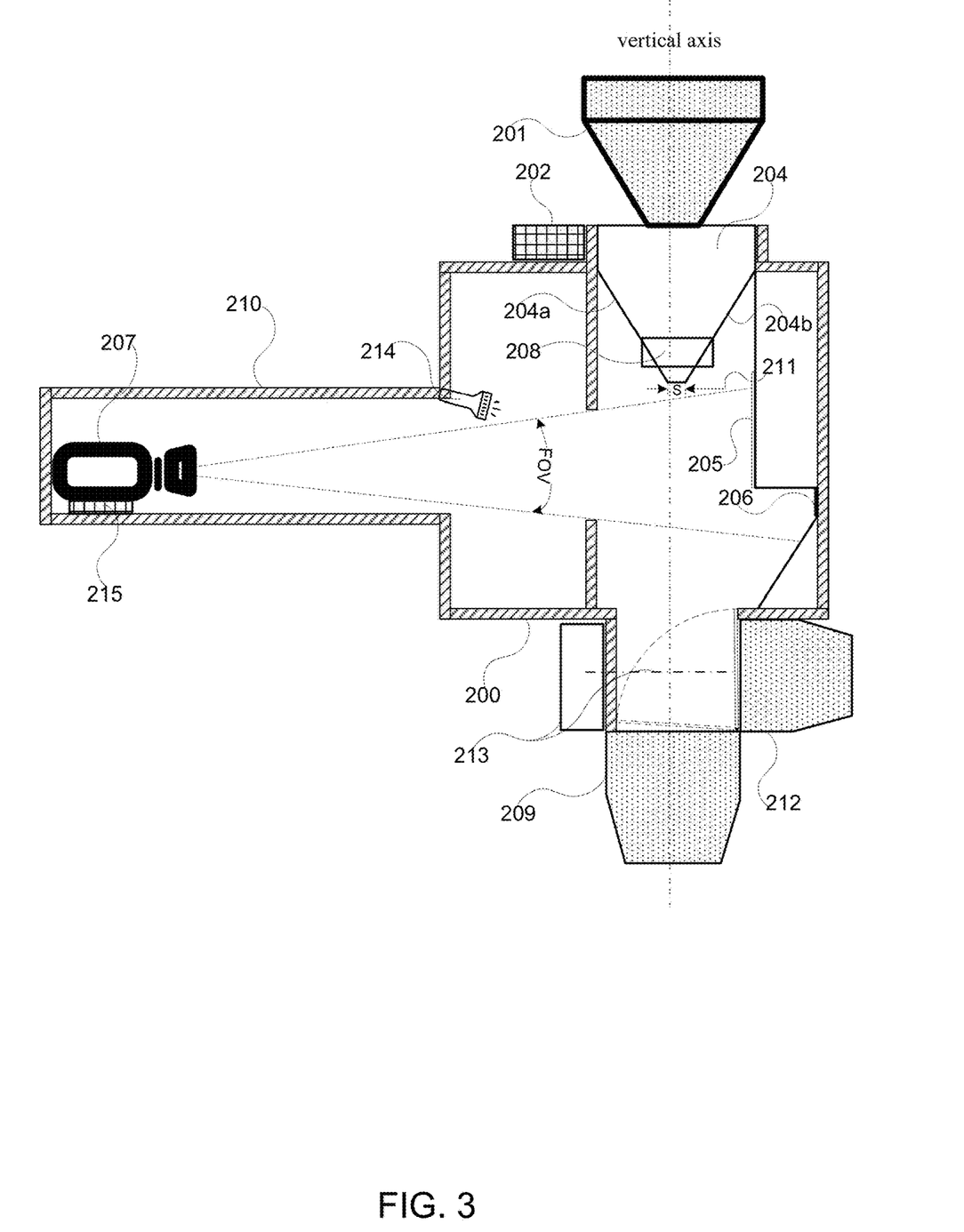
FIG. 3 shows a cross-sectional side view of the automated grains inspection apparatus, in accordance with some exemplary embodiments of the disclosed subject matter.

Referring now to FIG. 3 showing a cross-sectional side view of the automated grains inspection apparatus (AIA) 100, in accordance with some exemplary embodiments of the disclosed subject matter. Slot feeder 204 comprises mainly of two panels (204a and 204b) facing each other, however each of which is tilted away from the vertical axis of the AIA 100. It can be appreciated from cross-sectional side view that slot feeder 204 has a trapezoid shape, in which the top base of the trapezoid is wide open as opposed to the narrow base (labeled "S" for slot), which can be adjusted by feeder mechanism 202. In some exemplary embodiments, the feeder mechanism 202 can adjust slot 211 of slot feeder 204 to a span that correspond to typical thickness of a type of grain under inspection.

It will be noted that grains poured to inlet funnel 201 ingress slot feeder 204, via the so called "top base of the trapezoid" and egress the slot feeder, in curtainlike formation, into outlet 209 while crossing the field of view (FOV) of camera 207. In some exemplary embodiments, the span of slot 211 can be manually adjusted by means of feeder mechanism 202. For example, handle, lever, screw bolt, and any combination thereof, or any commercially available mechanical means. Additionally, or alternatively, feeder mechanism 202 can be configured to be automatically adjusting the span of slot 211, by means of: electrical/pneumatic motor, actuators, and any combination thereof, or the like. In some exemplary embodiments, the automatic adjustment of the feeder mechanism 202 can be controlled by a controller of the present disclosure (to be described in detail further below).

In some exemplary embodiments, sorting mechanism 213 can be comprised of mechanism types, such as deflection; flap removal; pressurized-air removal, diverter valve, and any combination thereof, or the like.

Both flap and pressurized-air removal can be utilized for rejecting a relatively small number of grains that fail the quality control. In some exemplary embodiments, upon detection of unqualified grain (to be described in detail further below) a small number of grains are removed from the production line by either a flap type or pressurized-air. It should be noted that, this removal either by the flap or by pressurized-air may be primarily, however not necessarily, used in an in-line and in-parallel production-line configurations. It should also be noted that, this discarding (removing) process may be repetitive as long as unqualified grains are detected.

In some exemplary embodiments, the flap removal type may be based, for example, a piece of a flat shelf hinged on one side, that covers an opening. Upon activation, the flap opens to enable a predetermine number of grains to be discarded.

In some exemplary embodiments, the pressurized-air removal type can be based on a commercially available air nozzle that blasts away, upon activation, a number of grains. The approximate amount/number of grains to be discarded can be controlled by adjusting the blast duration and diameter of the air jet.

In some exemplary embodiments, a deflection sorting mechanism may be primarily, however not necessarily, utilized in an off-line the production-line configuration. The deflection mechanism type may be based on a hinged door that operates as a selector allowing grains to outlet 209, i.e., to production line, or deflect the grains to second outlet 212. Typically, activation deflection allows relatively large amount of grains to be discarded, i.e., second outlet 212, opens to enable a predetermine number of grains to be discarded.

In some exemplary embodiments of the disclosed subject matter, the sorting mechanism 213, such as the types listed above may utilize solenoids, motors, actuators pneumatic components, and any combination thereof, or the like for implementing any or all the sorting mechanism types.

Among other components, FIG. 3 depicts the side view of camera 207, the first background surface 205, the second background surface 206 and at least one background illumination 214. In some exemplary embodiments, camera 207 may be situated in camera assembly 210 that enables sliding the camera forward and backward, i.e., toward and away from background surfaces 205 and 206, so that the camera's FOV shall cover an area containing both backgrounds. The sliding of camera 207 may be done by means of sliding mechanism 215 in order to adjust the distance between a focal point of the camera and the area covering the background, hereinafter region of interest (ROI). In some exemplary embodiments, sliding mechanism 215 may be controlled either manually and or automatically by means of motion control unit (MCU) 604 (to be described in detail further below).

Camera 207 of the present disclosure is configured to obtain an image of grains falling from the slot feeder 204, in curtainlike formation, in front of the first and second background surfaces 205 and 206. In some exemplary embodiments, camera 207 can be a video camera, a line scan camera, a stills camera, a monochromatic camera, a color camera, an area camera, and any combination thereof, or the like. An area camera is beneficial to be used in the current apparatus since it can capture a significant number of grains on more than one background. The sensor used in the area camera has a large matrix of image pixels so that a usual two-dimensional image can be generated in one exposure cycle, and therefore, its efficiency is enhanced relative to the other options. At least one of the plurality of cameras should be an area camera. Additionally, or alternatively, camera 207 can comprise different wavelengths optical filters (not shown) that may be configured as lowpass, high-pass, bandpass, and any combination thereof, or the like. The filters may be used for color correction; color conversion; color subtraction; contrast enhancement; polarizing; neutral density; cross screen; diffusion and contrast reduction, and any combination thereof, or the like. It should be noted that, the optical filters may be utilized for enhancing spatial, contrast and color resolution of grains (shall be described in detail further below). In some exemplary embodiments, camera 207 can be comprised of a plurality of cameras, wherein each camera of the plurality of cameras can be configured for acquiring different image properties. It should be noted that, the image may be video, at least one still photo, and a combination thereof and wherein the image may be retained in a digital representation.

In some exemplary embodiments, the at least one background illumination 214 can be situated in front of the backgrounds, behind the backgrounds, or both, i.e., in front and behind the backgrounds. Additionally, or alternatively, at least one of the background illuminations 214 may have different wave length or can use subtraction filters, intended for color separation. Additionally, or alternatively, one of the surfaces is can act also as an illuminator.

In some exemplary embodiments, first background surface 205 can be (however not limited to) white, and second background surface 206 can be (however not limited to) black. It should be noted that, that ROI acquired by camera 207 is configured to capture grains falling in front of the white and black background, i.e. first and second background surfaces 205 and 206, respectively. In some exemplary embodiments, the first and second background surfaces 205 and 206 may each comprise a grid configured to facilitate image analysis. It will be understood that the white background facilitates analysis of grains pigmentation and or other color defects, whereas the black background facilitate analysis of geometric (shape) defects of grains. In some exemplary embodiments, the second background surface 206 (black) can be recessed with respect to the first background surface 205 (white). The black background is recessed with respect to the white background in order to avoid reflection of the black background onto transparent grains while they are still in front of the white background. In other words, if the black background was flush with the white background the black background could cause artifacts on the grains that face the white background. It should be noted that, an image of the white background is analyzed for color and hue contamination, thus black reflection (artifact) may be confused for contamination.

It should be noted that parameters of the background or backgrounds can be manually or automatically changed such as width of each background, positioning of the background one on respect to the other, colors of the backgrounds, etc.

Figure 4:
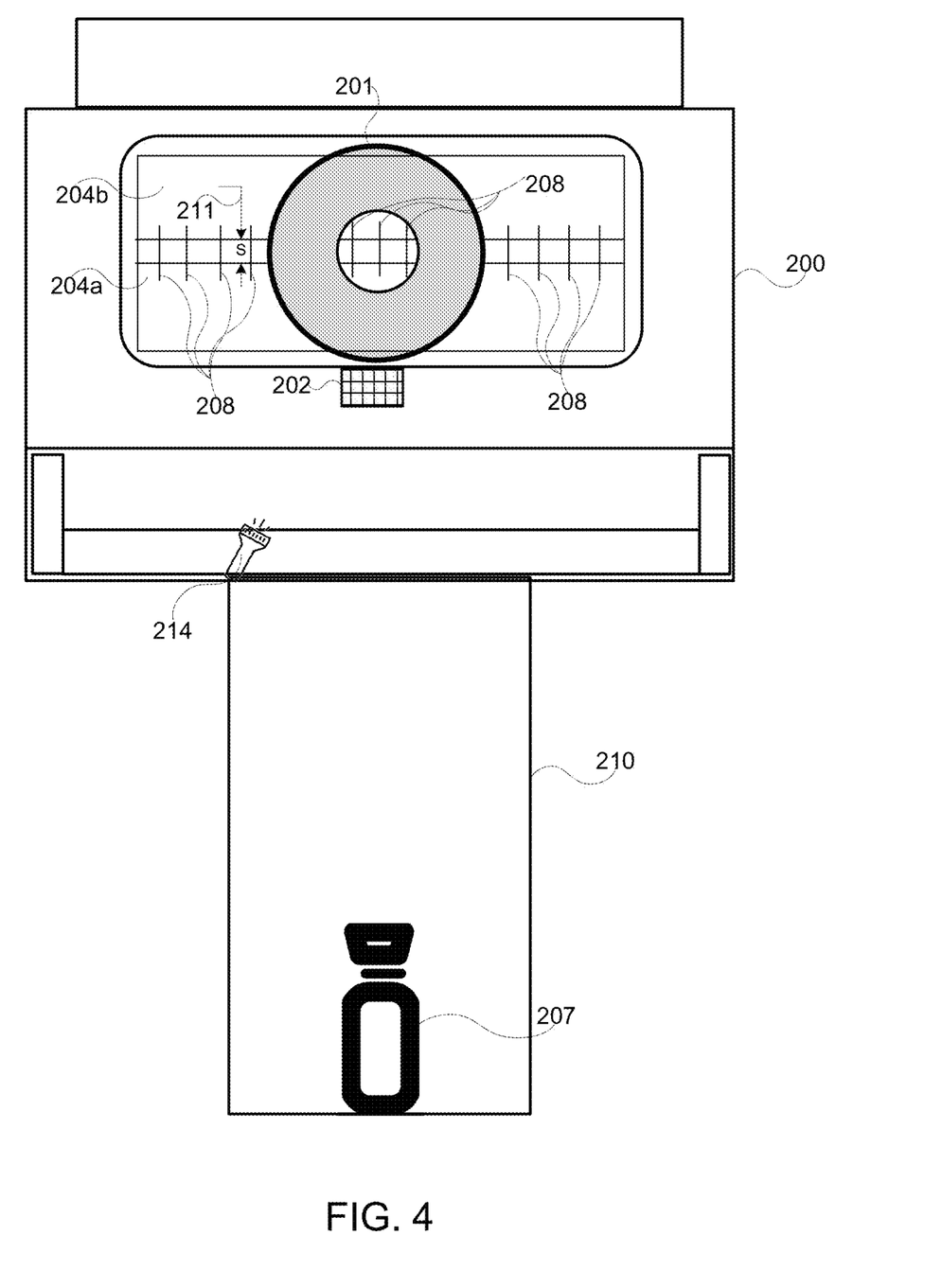
FIG. 4 shows a top view of the automated grains inspection apparatus, in accordance with some exemplary embodiments of the disclosed subject matter.

Referring now to FIG. 4 showing a top view of the automated grains inspection apparatus (AIA) 100, in accordance with some exemplary embodiments of the disclosed subject matter. Slot feeder 204 further comprises a plurality of blades 208, which are also shown in FIGS. 2 and 3. In some exemplary embodiments, the plurality of blades 208 that are organized perpendicularly along the slot feeder 204 can assist in dispensing the grains uniformly across the FOV, i.e., curtainlike formation. The blades 208 also facilitate in regulating the flow of grains through the feeder since the buildup of the grain pile can be controlled.

The blades can be moved one in respect to the others, manually or automatically.

Figure 5:
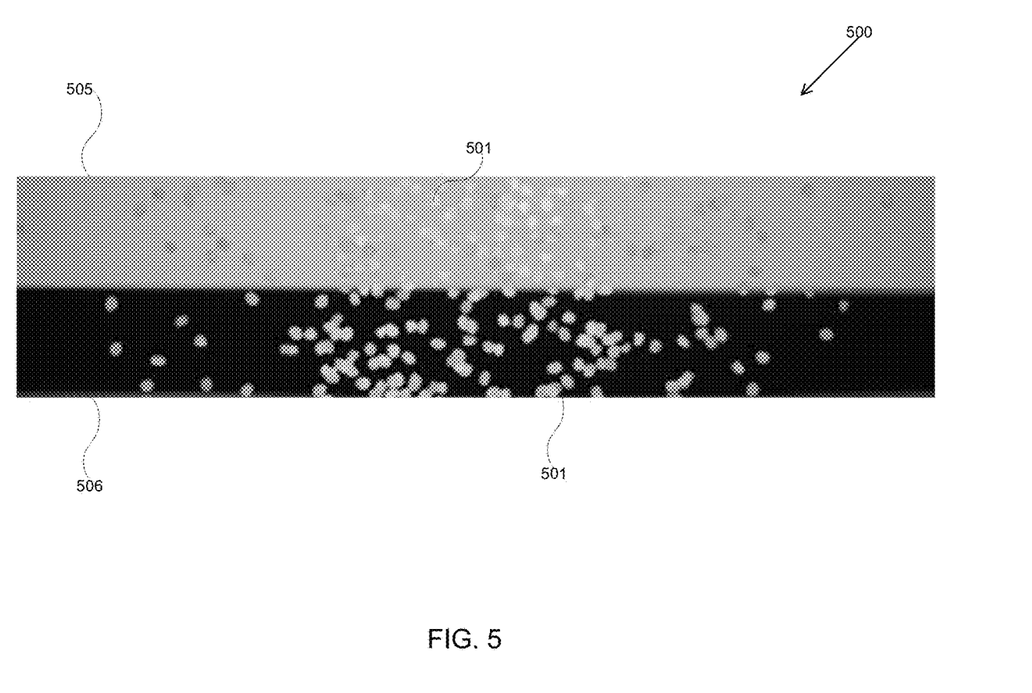
FIG. 5 is a screenshot of a video frame showing grains in inspection process, in accordance with some exemplary embodiments of the disclosed subject matter.

Referring now to FIG. 5 is a screenshot of a video frame showing grains in inspection process, in accordance with some exemplary embodiments of the disclosed subject matter. The video frame 500 shows an image of captured grains 501 in the ROI in front of the white section 505 and black section 506. It should be noted that, the white section 505 enables analyzing grains 501 pigmentation, color and hue qualifications with respect to predetermined thresholds. On the other hand, the black section 506 enables analyzing grains 501 for geometric size, shape, and structural properties qualifications with respect to predetermined thresholds. In cases the grains are dark, the information retrieved from each of the backgrounds is the opposite from the information retrieves for light color grains that are shown in FIG. 5.

Figure 6:
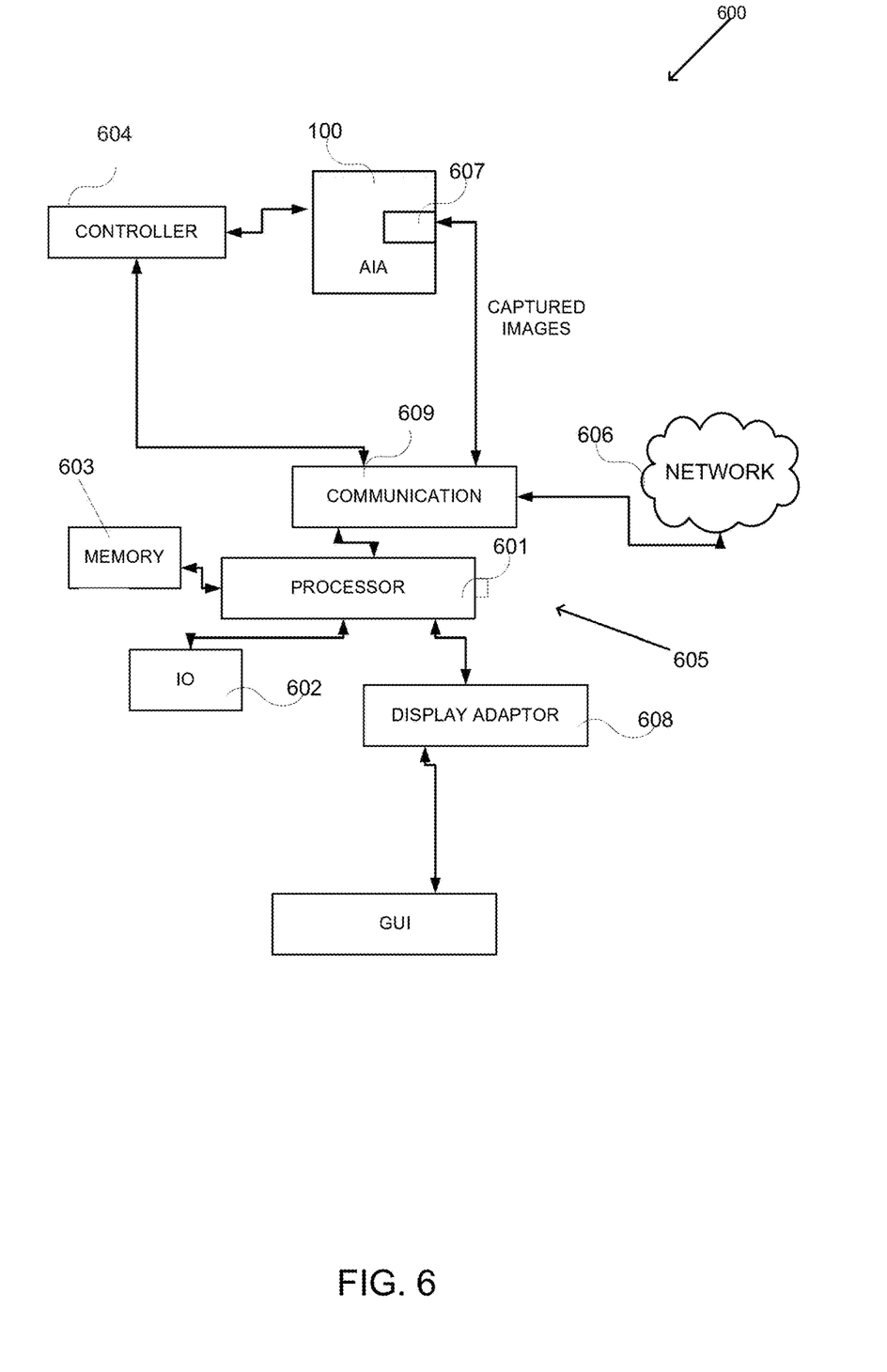
FIG. 6 shows a block diagram of a grains inspection system, in accordance with some exemplary embodiments of the disclosed subject matter.
Figure 7:
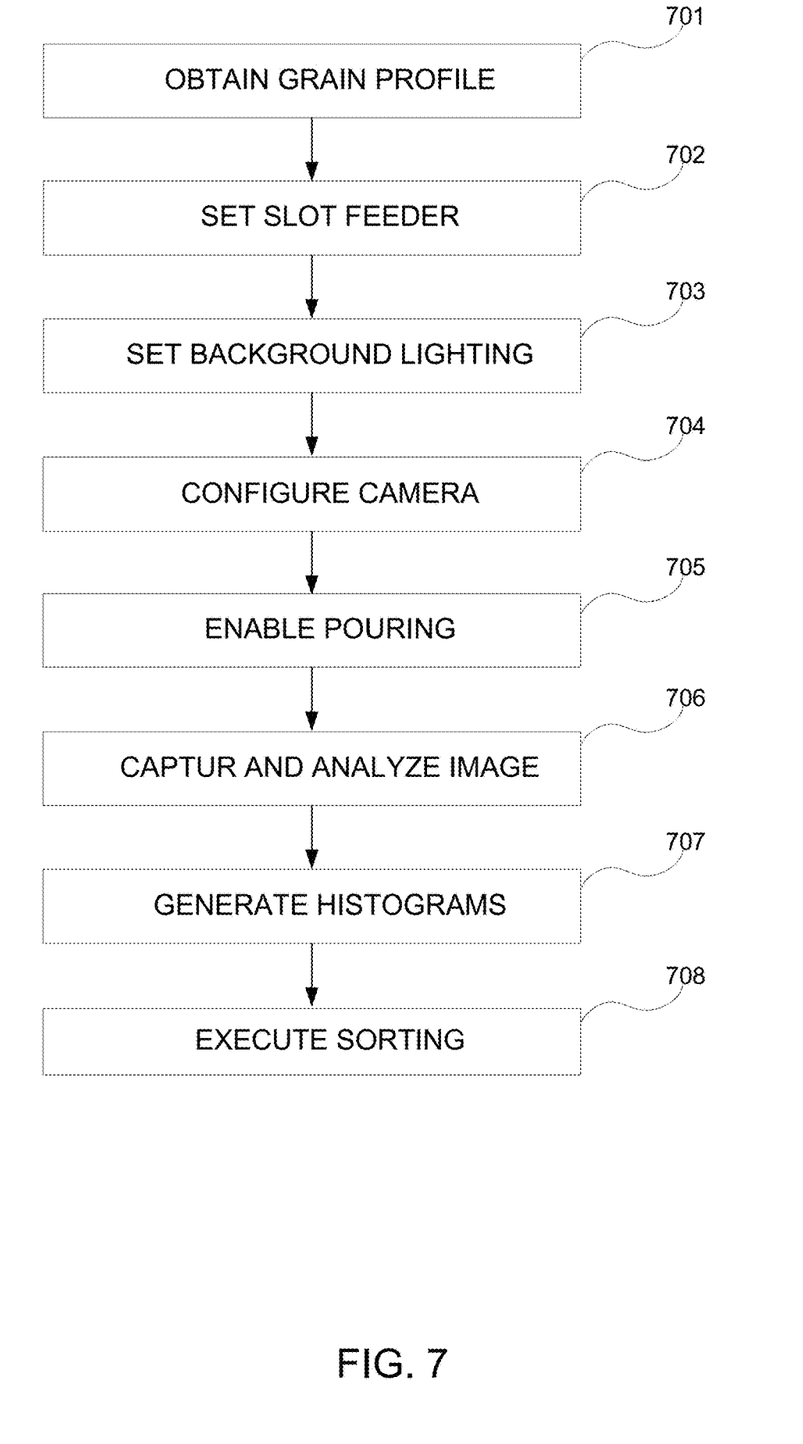
FIG. 7 shows a flowchart diagram of a method for grains inspection, in accordance with some exemplary embodiments of the disclosed subject matter.

Referring now to FIG. 6 showing a block diagram of a grains inspection system 600, in accordance with some exemplary embodiments of the disclosed subject matter. System 600 is a computerized apparatus adapted to perform methods such as depicted in FIG. 7.

In some exemplary embodiments, system 600 comprises an AIA 100 that is communicating with a processor 601. Processor 601 is a preferably a central processing unit (CPU), a microprocessor, an electronic circuit, an integrated circuit (IC) or the like. Additionally, or alternatively, system 600 can be implemented as firmware written for or ported to a specific processor such as digital signal processor (DSP) or microcontrollers, or can be implemented as hardware or configurable hardware such as field programmable gate array (FPGA) or application specific integrated circuit (ASIC). Processor 601 can be utilized to perform computations required by system 600 or any of its subcomponents.

In some exemplary embodiments of the disclosed subject matter, system 600 can comprise an Input/Output (I/O) Module 602. System 600 can utilize I/O Module 602 as an interface to transmit and/or receive information and instructions between system 600 and external I/O devices using devices such as mouse, keyboard, or touch screen. In some exemplary embodiments, the processor 601 is comprised within a workstation 605 that comprises also a memory 603, a display adaptor 608, a communication module 609, or the like. The communication module 609 can be interfacing with a network 606.

In some exemplary embodiments, I/O module 602 may be used to provide an interface to a user of the system, such as by providing output, visualized results (such as depicted in FIGS. 5, 8, 9 and 10), reports, such as grain size, improper cutting monitoring and color/hue defects, or the like on the display 608 using UI or GUI. The user can use workstation 605 to input the information, such as pass/fail thresholds, discarding grains batch, conducting statistic calculations based on previously inspections that are retained in the system or in a network repository. However, it will be appreciated that system 600 can operate without human operation.

In some exemplary embodiments, network 606 can be used to facilitate communication between processor 601 with cloud computing server (not shown) such as amazon web services (AWS) having increased and scalability. Additionally, or alternatively, network 606 connection can be used to communicate with another apparatus or a data repository of the production facility. Additionally, or alternatively, system 600 may use network 606 connection for retaining recoded information of the AIA 100 in cloud repository (not shown) or any other network storage.

In some exemplary embodiments, system 600 comprises a controller 604. The controller 604, interfaced with processor 601 via communication 609 is configured to drive and sense activities associated with electro-mechanic and or pneumatic components of the AIA 100 and the camera 607 within the AIA, such as illumination, image capturing, IOs, and the span of the slot. The controller 604 communicates with the processor 601 and can automatically control the AIA 100. In some exemplary embodiments, the drive and sense activities can comprise manipulating the inlet funnel 201; feeder mechanism 202; the slot feeder 204; the video camera 207; the sorting mechanism 213; the background illuminations 214; the sliding mechanism 215; and any combination thereof, or the like.

In some exemplary embodiments, the camera 607 in the AIA 100 is interfacing with processor 601 to transfer the captured images and convey the images in digital representation to the processor 601 for image analysis. In some exemplary embodiments, the images captured from the at least one camera can comprise cameras selected from a group consisting of video cameras, stills cameras, area camera, line scan camera, video cameras, a monochromatic camera, a color camera, and any combination thereof, or the like.

In some exemplary embodiments, camera 607 can comprise an array of optical filters (not shown) adapted to be engaged in front of a lens of the at least one camera by the controller 604.

In some exemplary embodiments, system 600 can comprise a memory unit 603. Memory unit 603 can be persistent or volatile. For example, memory unit 603 can be a flash disk, a random access memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as flash device, memory stick, or the like. In some exemplary embodiments, memory unit 603 can retain program code to activate processor 601 to perform acts associated with any of the steps shown in FIG. 7. Memory unit 603 can also be used to retain images captured by camera 607, a plurality of grain profiles, outcomes of system 600 (reports), image analysis of each inspection sequence, reference profiles comprising thresholds for different types of grains, statistical analysis associated with reference profiles; and any combination thereof, or the like.

The components detailed in system 600 can be implemented as one or more sets of interrelated computer instructions, executed, for example, by processor 601 or by another processor. The components can be arranged as one or more executable files, dynamic libraries, static libraries, methods, functions, services, or the like, programmed in any programming language and under any computing environment.

Referring now to FIG. 7 showing a flowchart diagram of a method for grains inspection, in accordance with some exemplary embodiments of the disclosed subject matter.

In step 701, a grain profile is obtained. In some exemplary embodiments, a grain profile associated with type of grain to be inspected can be obtained from a data repository of system 600, such as for example, memory 603 or a storage connected to network 606. The grain profile can be one of a plurality of grain profiles retained in the repository, wherein each grain profile is associated to different type of grain. In some exemplary embodiments, the types of grains can differ from one another in terms of size, color, shape, transparency, weight, and any combination thereof, or the like. Therefore, each type of known grain may have a profile characterizing it for the AIA 100 of the present disclosure.

In some exemplary embodiments, each grain profile of the plurality of grain profile can comprise predetermined parameters associated to the AIA 100 setup. The parameters can comprise: camera configuration, illumination and background setup, span of the slot feeder, and standard thresholds.

In step 702, the slot feeder is set. In some exemplary embodiments, system 600 adjusts the span 211 of the slot feeder 204 to meet the requirements of a grain size as per the parameters of the current grain profile.

In step 703, the background lighting is set. In some exemplary embodiments, system 600 can set at least one of the background illuminations 214 to meet the requirements of the grains color, hue, size and transparency as per the parameters of the current grain profile. It should be reminded that illuminations 214 can be set for illuminating either sides of the backgrounds as well as both sides simultaneously. Additionally, or alternatively, system 600 can cause the illuminations 214 to alternate side illumination during the inspection process as well as dimming the illumination during the process, all in order to improve image resolution of the grains inspection.

In step 704, the camera is configured. In some exemplary embodiments, system 600 can set at least one camera 207 to meet the requirements of the grains color, hue, size, shape and transparency as per the parameters of the current grain profile. It should be reminded that, more than one camera can be used simultaneously as previously described. Additionally, or alternatively, system 600 can cause one or more cameras 207 to alternate image capturing during the sorting process as well as engaging optical filters in the image capturing process, all in accordance to the current grain profile.

In step 705, grains pouring is enabled. In some exemplary embodiments, grains can be enabled to enter the inlet funnel to initiate the grain monitoring and inspecting process.

In step 706, an image is captured and analyzed. In some exemplary embodiments, a digital representation of the image can be routed by the video front end 207 to processor 601 for image analysis. The image analysis is configured to determine criteria of each grain in the image, wherein the criteria are selected from a group consisting of size, pigmentation, shape, color, hue and morphology of the grains. In some exemplary embodiments, the images are retained in the repository in records of 60 seconds each.

Figure 8:
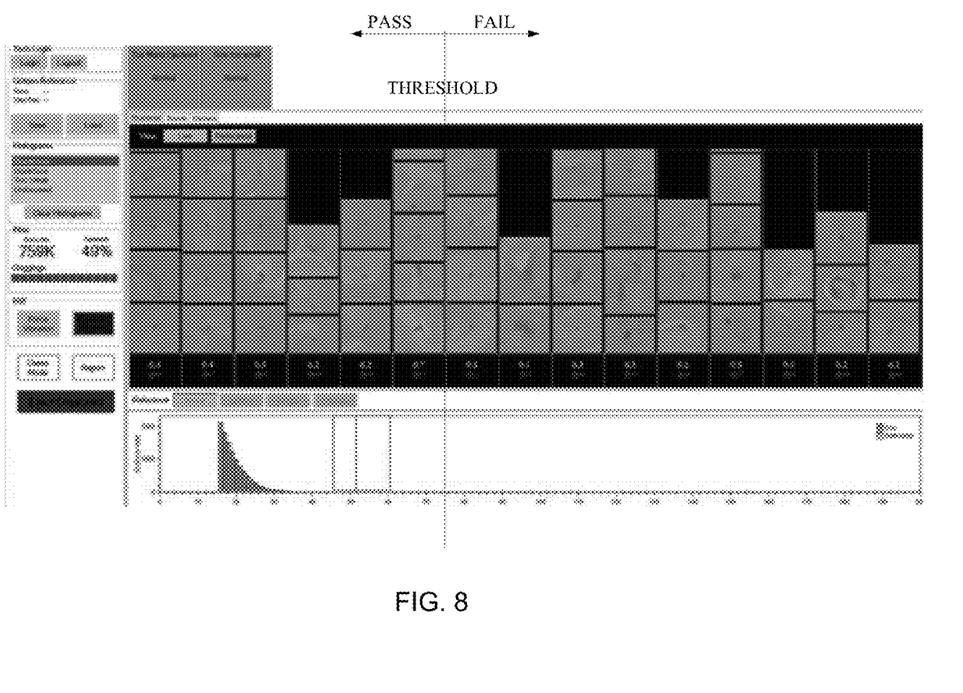
FIG. 8 shows a workstation screenshot depicting an outcome report, in accordance with some exemplary embodiments of the disclosed subject matter.
Figure 9:
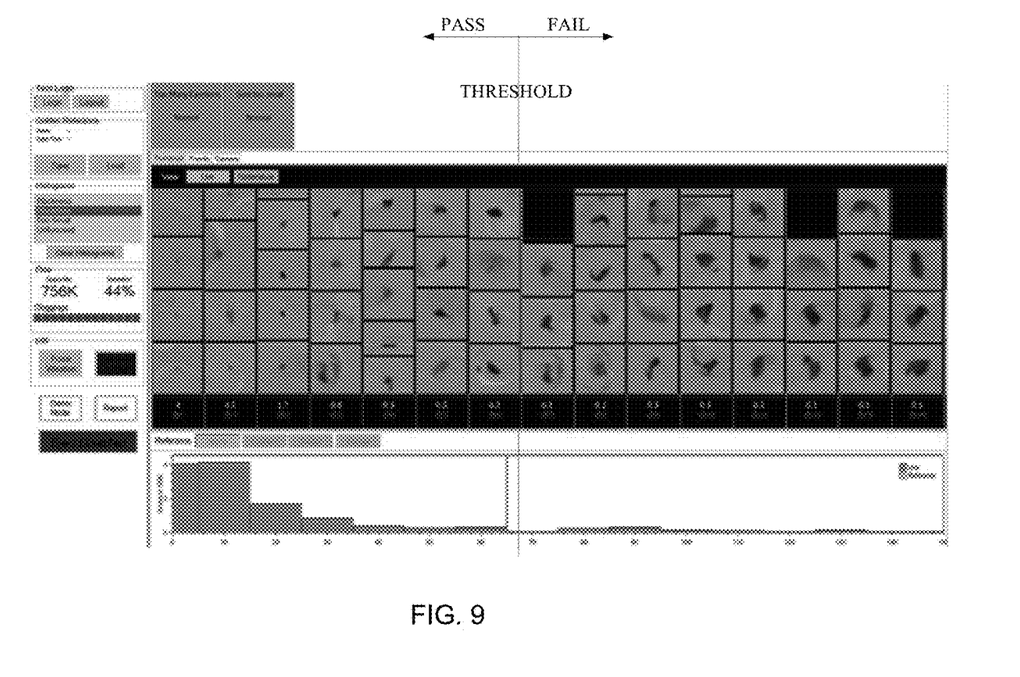
FIG. 9 shows the workstation screenshot depicting another outcome report, in accordance with some exemplary embodiments of the disclosed subject matter.
Figure 10:
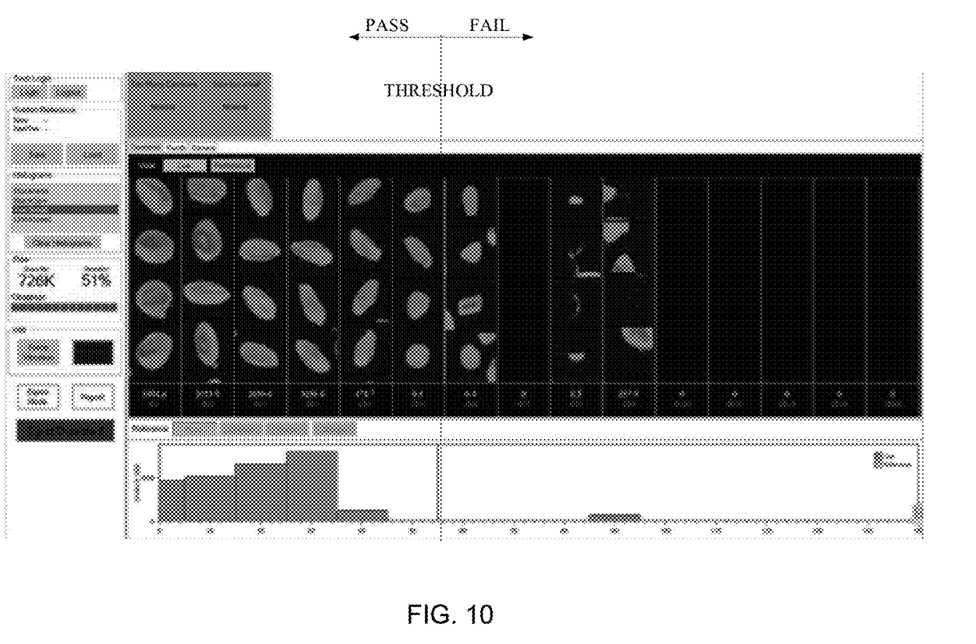
FIG. 10 shows the workstation screenshot depicting yet another outcome report, in accordance with some exemplary embodiments of the disclosed subject matter.

In step 707, histograms are generated. In some exemplary embodiments, system 600 is adapted to generate a histograms representation, such as depicted in FIGS. 8, 9, and 10, for each criterion listed above. It should be noted that the horizontal axis of each histogram represents dimension, preferably but not necessarily given in microns and the vertical represents incidences, scaled in 100K grains. Each bar of each histogram comprises a representing thumbnail-image per 100K grains. For example, FIG. 8 shows a histogram of blackness criteria measured in microns; FIG. 9 shows a histogram of black size criteria measured in microns; and FIG. 10 shows a histogram of grain size criteria measured in microns. It should be noted that other parameters can be monitored, inspected, and represented in the histograms such as grain size, grain shape, contamination size and shape, color deviation, absolute color of the grains, etc.

Optionally, in step 707, sorting is executed. In some exemplary embodiments, the sorting can be executed based on predetermined parameters of a given grain profile that comprise standard thresholds. The thresholds dictates predetermine pass/fail discrimination levels for each criterion, such as depicted in the examples of FIGS. 8, 9, and 10. In some exemplary embodiments of the disclosed subject matter, system 600 can react to any deviation from the standard in one of the following ways: set an alarm or a signal, activate the sorting mechanism 213 to either deflect unqualified grains to second outlet 212 or remove relatively small number of grains that fail the sorting, or abort sorting.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. An automated grains inspection apparatus, the automated apparatus comprising:
an inlet to receive the grains;
an outlet from which the grains are discharged;
a feeder configured to receive the grains from the inlet and release the grains aligned in a line formation;
at least one camera positioned sideway beneath the feeder to capture images of the grains while they fall; and
at least one background surface positioned sideway beneath the feeder and opposite the camera so that the grains are configured to be aligned between the camera and the background surface.

2. The inspection apparatus as claimed in claim 1, further provided with at least one illumination directed towards the background surface and configured to pass through the grains when falling.

3. The inspection apparatus as claimed in claim 1, wherein at least one of the cameras is an area camera.

4. The inspection apparatus as claimed in claim 1, wherein the at least one background surface is two background surfaces and said two background surfaces comprise a white background and a black background.

5. The inspection apparatus as claimed in claim 4, wherein the black background is recessed with respect to the white background.

6. The inspection apparatus as claimed in claim 1, wherein the feeder is a slot feeder.

7. The inspection apparatus as claimed in claim 6, wherein the slot is an adjustable slot having a span configured to correspond to the grains under inspection.

8. The inspection apparatus as claimed in claim 1, further comprising a sorting mechanism.

9. The inspection apparatus as claimed in claim 8, wherein the sorting mechanism is selected from the group of sorting mechanisms consisting of deflection; diverter valve, flap removal; pressurized-air removal, a combination thereof, and the like.

10. The inspection apparatus as claimed in claim 1, further comprising a plurality of blades organized perpendicularly along the feeder.

11. The inspection apparatus as claimed in claim 1, wherein the apparatus is positioned within a grain production line.

12. A grain inspection system to be operated by a user comprising:
an automated grains inspection apparatus as claimed in claim 1;
a controller configured to control at least the at least one camera and the feeder within the inspection apparatus; and
a processor configured to receive captured images from the at least one camera and analyze the captured images as well as transmit or receive information and instructions based on an analysis of the captured images.

13. The grain inspection system as claimed in claim 12, which further comprises a memory unit communicating with said processor wherein the memory unit is configured to retain information selected from a group of information consisting of the captured images, a plurality of grain profiles, system settings, system reports, image analysis, reference profiles comprising thresholds for different types of grains, statistical analysis associated with reference profiles; any combination thereof, or the like; and a display configured to display histograms and thumbnail-image generated in the processor based on the captured images.

14. The method as claimed in claim 12, further comprising setting background lighting directed onto the at least two background surfaces and through the grains while falling.

15. The method as claimed in claim 12, wherein the at least one camera is an area camera.

16. The method as claimed in claim 12, wherein the at least one background surface is two background surfaces and said two background surfaces comprise a white background and a black background.

17. The method as claimed in claim 12, further comprising analyzing the grains and determining criteria of each grain in the image, wherein the criteria are selected from the group consisting of size, pigmentation, shape, color, hue, and morphology of the grains.

18. The method as claimed in claim 17, further comprising generating histogram representations of dimensions and criteria of the grains.

19. The method as claimed in claim 18, further comprising setting thresholds based on the histogram representations and thumbnail images.

20. The method as claimed in claim 19, wherein the predetermined parameters comprise thresholds.

21. The method as claimed in claim 12, further comprising sorting the grains based on predetermined parameters of the grain profile.

22. A method of automatically inspecting grains comprising:
providing an inspection apparatus as claimed in claim 1;
obtaining grain profile of the grains;
setting a slot in the feeder according to the grain profile;
pouring the grains into the inlet and through the feeder so as to allow the grains to fall through the slot in a line arrangement and into the outlet;
operating the camera so as to capture images of grains falling beneath the slot; and
inspecting the grains in the images.

* * * * *